Mar. 3, 1925. Re. 16,013
R. P. SIMMONS
ELECTRIC HAIR WAVER
Original Filed July 30, 1923
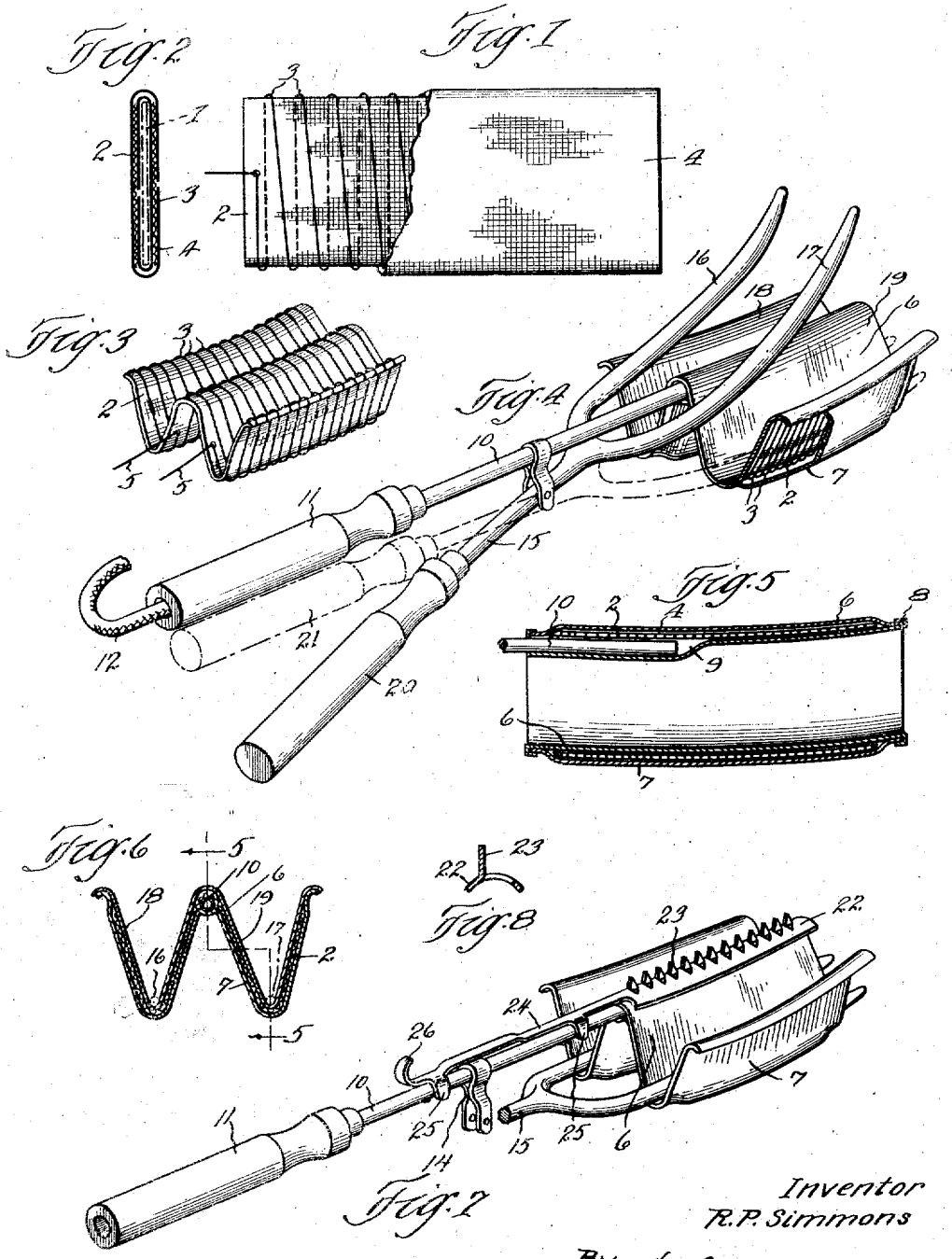
Inventor
R. P. Simmons
By Hull, Brock & West
Attys.

Reissued Mar. 3, 1925. Re. 16,013

UNITED STATES PATENT OFFICE.

ROBERT P. SIMMONS, OF CLEVELAND, OHIO.

ELECTRIC HAIR WAVER.

Original No. 1,488,621, dated April 1, 1924, Serial No. 654,632, filed July 30, 1923. Application for reissue filed July 11, 1924. Serial No. 725,525.

*To all whom it may concern:*

Be it known that I, ROBERT P. SIMMONS, a citizen of the United States, residing at Cleveland, in the county of Cuyahoga and State of Ohio, have invented a certain new and useful Improvement in an Electric Hair Waver, of which the following is a specification.

This invention relates primarily to hair waving implements and more particularly to the construction of an electrical appliance which may be electrically heated by a connection with the usual electric lighting source for imparting artistic and attractive wave forms to the hair.

One of the objects of my invention is to provide an electric hair waver which is simple in construction and capable of inexpensive manufacture on a quantity production basis.

Another object of my invention is the provision of a heating element which may be deformed from a shape in which it is readily manufactured into the shape of the wave forms which it is desired to impart to the hair.

A further object of the invention is to provide a pair of plates having the shape of the wave forms to be given to the hair, which plates may be fitted together with the heating element between them but so closely related to the plates that substantially the entire quantity of heat generated by the heating element is immediately conducted to the plates raising their temperature to a predetermined degree and maintaining that temperature efficiently during the hair waving process.

A still further object of my invention is to provide means for gently but firmly pressing different portions of hair from its extremity to a position closely adjacent the head against the wave forming plates thereby to impart an artistic and attractive wave to the hair appealing to the esthetic sense.

Another object of the invention is to provide means heated by the wave forming heating element for imparting limited lateral movement to the hair during the period that it is being pressed against the heated wave forming plates to secure a French style of wave in the hair.

Other and further objects of my invention will be pointed out in the following specification and the appended claims with particular reference to the accompanying drawings in which Fig. 1 is a plan view of the heating element used in the hair waver of this invention, the insulation around the heating wires being broken away to clearly show the construction of the element; this view shows the element in its manufactured shape before it has been deformed to the shape in which it is used in the hair waver; Fig. 2 is a cross sectional view of the heating elements shown in Fig. 1 before it is deformed to the shape in which it is employed in the hair waver; Fig. 3 is a perspective view of the heating element with the insulated covering removed illustrating the shape to which the heating element is deformed for use in the hair waver; Fig. 4 is a perspective view of my assembled electric hair waver, the outside plate of the wave forming portion being broken away to show the position of the heating element between the wave forming heated plates; Fig. 5 is a longitudinal cross sectional view through the wave forming plates of my electric hair waver taken on line 5—5 of Fig. 6 which is a cross sectional view taken laterally through the hair waver heating plates and heating element; Fig. 7 is a perspective view of my invention having detachable means for laterally moving the hair while it is pressed in the wave forming plates for imparting a French wave to the hair; and Fig. 8 is a cross sectional view of the detachable comb-like member positioned at the top of the wave forming plates for laterally moving the hair in certain limits while it is being pressed in the waver.

My invention contemplates forming a heating element on a sheet of insulating material which is bent about a mandrel for the purpose of winding. After the wire is wound upon the base, further insulation material is wrapped around the element which insulates the heating wire from contact with the metallic surfaces hereinafter described. After the heating element is completed it is deformed, warped or pressed out of its original flat shape into an approximate W shape or a wave form corresponding approximately to a sine wave or the wave like form it is desired to impart to the hair. An extremely thin heating unit is thus provided by the process described. I insert this thin unit between a pair of metallic surfaces correspondingly shaped in wave form to the form obtained by the heating element. The metallic surfaces are uniformly and instantaneously heated to the desired temperature substantially by conduction. A hollow stem and handle is arranged to support and manipulate the hair waver. The leads to the heating element are taken through the hollow stem and handle to a flexible conduit connection provided with an adapter which may be plugged into any electric light socket or connected to a suitable source of energy for energizing the heating element. A double prong member is pivoted relative to the electric hair waver element and may be opened to enable the hair to be laid across the wave formed plates and then closed to pull the hair down into the extremity of the loop portions of the wave-shaped plates whereby the hair is pressed against the heated wave-shaped surface and maintained in tension for a period sufficient for it to become set in the wave shape of the plates. A French style wave may be imparted to the hair by employing an attachable comb-like structure slidably mounted on the middle crest portion of the wave-shape plates in such manner that heat is conducted to the comb from the heating element. The comb may be reciprocated within narrow limits drawing the hair backward and forward at the crest point the hair being firmly secured by the prongs at the extremity of the loops of the wave-shaped plates, preventing the hair from following the action of the comb.

My invention will be more clearly understood by more particular reference to the drawings in which reference character 1 designates a mandrel which is used in winding the heating element. An asbestos sheet 2 is wrapped around the mandrel forming the core of the heating element. Mica or any other insulating material may of course be used as a core member. When mica is used slots are cut on each side to prevent the turns of the resistance wire from slipping whereas in the case of asbestos the wire bites into the soft asbestos which prevents the turns of the wire from slipping and shorting. The heating wire 3 is wound on the core 2 and the leads fixed as indicated at 5. The element is next wrapped with insulation material 4 such as asbestos which forms a protective casing around the heating element preventing electrical contact with the metallic sheets 6 and 7 and also serving to reduce the heat developed to a predetermined desired temperature. The heating element is now deformed from its flat shape into a W or approximately sine wave shape as shown in Fig. 3. Metallic plates 6 and 7 also of wave form are arranged with the heating element inserted between their inner faces and the plate 6 secured firmly in position with respect to plate 7 by a turned over edge 8. The middle or crest portion of the wave-shaped plates 7 is of a reduced vertical dimension for a part of its length to enable the supporting stem 10 to be inserted between the plates 6 and 7 which stem is provided with a handle 11 to facilitate the manipulation of the hair waver. The stem and handle are hollow to permit the connection to the heating element at 5 to be extended through the device to the flexible exterior connection 12. At a point 14 on supporting stem 10 I pivot a lever 15 having prongs 16 and 17 which pull the hair down into the crevices or the extremity of the loop portions of the waver pressing the hair against the crest or middle portion of the plates and against the walls 18 and 19 of plates 6 and 7. The lever 15 is manipulated by means of a handle 20 which is closed with reference to handle 11 as indicated in dotted lines at 21 when the hair is forced down against the hot plates by means of prongs 16 and 17.

A detachable comb-like structure 22 may be provided with a portion extending over the crest portion of the wave-shaped plates whereby heat is transferred by conduction to the comb and to the vertical teeth 23. The hair is normally laid over the wave-shaped plates, the prongs 16 and 17 being raised out of place, with the strands entering between the several teeth of the comb and then the prongs 16 and 17 closed down pressing the hair against the hot plates and drawing the strands through the comb. The prongs 16 and 17 may be knurled to firmly anchor the hair. The comb 22 may then be reciprocated by moving trigger 26 on arm 24 backward and forward, the comb being guided with relation to the stem 10 by means of depending members 25. The regular wave imparted to the hair by pressing it against the wave-shaped plates may now be modified to a French style or snake wave by operating the comb 22 within the limits permitted by the hair being secured in the lowermost portion of the wave-shaped plates.

The arrangement of my electric hair waver is such that the waver may be moved over the different parts of the hair and a wavy appearance imparted to the strands of hair as desired, moving the waver into close proximity of the head.

While I have described my invention in a certain limited embodiment it will be understood that various modifications may be made without departing from the spirit of the invention. For example the resistance element might be wound on a base already shaped in wave-like formation without the necessity of deforming the element after it is prepared in flat sheet form. I intend no limitations upon my invention other than are imposed by the scope of the appended claims.

Having thus described my invention, what I claim is:—

1. An electric hair waver, comprising in combination a pair of similar wave-shaped metallic plates, a resistance element inserted therebetween, and means for pressing the hair against said plates whereby to impart a wave form to said hair corresponding to wave form of said plates.

2. An electric hair waver comprising in combination a substantially W shaped plate, a cover therefor, a heating element inserted between said cover and said plate, a reciprocating comb on the extremity of the middle crest portion of said W shaped plates, a plurality of teeth in said comb heated by said heating element and means for pressing the hair down into the outer corrugation of said plate and over said comb.

3. An electric hair waver, comprising in combination a heating unit, a plate having a central crest portion and a plurality of loop portions on opposite sides thereof, a cover therefor enclosing said heating unit, an attachable member arranged to be positioned on the extremity of said central crest portion said attachable member having a surface heated by conduction from said plate, a plurality of teeth on said attachable member, means for pressing the hair down into said attachable member and anchoring the hair therein and means for imparting limited reciprocating motion to said attachable member for moving said hair through a limited arc with the lower extremity of said loop portions as centers.

4. In a device of the kind described, a sheet metal casing sinuous in shape, and a flexible heating element contained within said casing and adapted to heat the same, and means for bringing the hair into contact with said casing.

5. In a device of the kind described, a sinuous shaped metallic casing and a heating element contained therein, said heating element including a flexible wire folded to conform to the shape of said casing.

6. An electric hair waver, comprising in combination, a pair of similar wave-shaped metallic plates, a resistance element having a shape corresponding to said plates inserted therebetween, and means for pressing the hair against said plates whereby to impart a wave form to said hair corresponding to wave form of said plates.

7. An electric hair waver, comprising in combination a pair of wave-shaped plates, a heating element inserted between said plates, said heating element comprising a core of insulating material, a plurality of turns of resistance wire wound upon said core and a covering of insulation material located over said wire whereby said wire is prevented from electrically contacting with the adjacent faces of said plates throughout the area thereof, and means for pressing the hair against said plates.

8. A heating element for an electric hair waver, comprising a relatively flexible core of sheet material, a plurality of turns of heating wire carried by said core, a relatively flexible covering of insulation material wrapped around said core and wire and a pair of approximately sine wave shaped metallic sheets, said heating element being secured between said sheets assuming the same contour as said sheets throughout the area thereof.

9. A heating element for an electric hair waver, comprising a substantially W-shaped heating surface, a pair of W-shaped metallic plates one of said plates fitting beneath said heating surface and the other of said plates fitting above said heating surface, said first named plate having its vertical dimension through a central portion of its length smaller than the vertical dimension of said last named plate, a supporting conduit secured in the space between said plates and means for securing said plates together.

10. A heating element for an electric hair waver comprising a substantially W-shaped heating surface having terminals connected to heating means on said surface, a pair of W-shaped metallic plates one of said plates fitting beneath said heating surface and the other of said plates fitting above said heating surface, said first named plate having its vertical dimension through a central portion of its length smaller than the vertical dimension of said last mentioned plate, a supporting conduit secured in the space between said plates, means for securing said plates together and wires in said supporting conduit connected to said terminals whereby said heating means may be electrically energized.

11. An electric hair waver comprising in combination a pair of similar wave-shaped metallic plates, a heating element having a shape corresponding to said plates inserted therebetween, means for electrically insulating said heating element from said plates and fixing the amount of heat transferred by said heating element to said plates, and means for pressing the hair against said plates whereby to impart a wave form to said hair corresponding to the wave form of said plates.

12. An electric hair waver, comprising in combination a heating unit having a central crest portion and a plurality of loop portions on opposite sides thereof, a pair of correspondingly shaped thin metallic plates enclosing said heating unit and means for pressing the hair down into said loop portions and over said central crest portion whereby the hair is maintained in tension over the surface of one of said plates and subjected to the heat from said heating unit.

13. An electric hair waver, comprising in combination a heating unit having a central crest portion and a plurality of loop portions on opposite sides thereof, a pair of correspondingly shaped thin metallic plates enclosing said heating unit and a pair of prongs having cross sections smaller than the curvature of said loop portions for pressing the hair down into said loop portions and over said central crest portion whereby the hair is maintained in tension over the surface of one of said plates and subjected to the heat from said heating unit for imparting wave forms to the hair.

14. An electric hair waver, comprising in combination a heating unit having a central crest portion and a plurality of loop portions on opposite sides thereof, a pair of correspondingly shaped thin metallic plates enclosing said heating unit, a reciprocating comb on the extremity of said crest portion, a plurality of teeth on said comb heated by said heating unit and means for pressing the hair down into said loop portions and over said comb.

15. An electric hair waver, comprising in combination a heating unit having a central crest portion and a plurality of loop portions on opposite sides thereof, a pair of correspondingly shaped thin metallic plates enclosing said heating unit, a longitudinal slidable member on the extremity of said crest portion in contact with one of said metallic plates, a plurality of teeth on said member, means connected with said member for imparting limited reciprocating motion thereto and means for pressing the hair down into said loop portions in tension over the surface of one of said metallic plates and having the strands thereof located between said plurality of teeth, said hair being firmly anchored at the lower extremity of said loop portions but free to move in a limited arc under reciprocating action of said slidable means.

16. An electric hair waver, comprising in combination a heating unit having a central crest portion and a plurality of loop portions on opposite sides thereof, a pair of correspondingly shaped thin metallic plates enclosing said heating unit, an attachable member arranged to be positioned on the extremity of said central crest portion, said attachable member having a surface heated by conduction from one of said metallic plates, a plurality of teeth on said attachable member, means for pressing the hair down into said attachable member and anchoring the hair therein and means for imparting limited reciprocating motion to said attachable member for moving said hair through a limited arc with the lower extremity of said loop portions as centers.

17. An electric hair waver having a heating element comprising in combination a sheet like heating surface deformed from a flat contour to an approximate sine wave contour, a pair of separate metallic sheets one or both having a wave shaped contour, one of said plates fitting over the top of said heating surface and the other of said plates fitting over the bottom of said heating surface, means for spacing said heating surface from the inner surfaces of each of said plates and means for pressing hair to be waved over the top surface of said first mentioned plate whereby heat is conducted from said heating surface to said hair.

18. An electric hair waver, comprising in combination a pair of metallic plates, one of said plates being arranged to be pressed against the hair to be waved, and a resistance element having a shape corresponding to said plates for heating the same, whereby a wave form is imparted to the hair.

19. A thin heating element for an electric hair waver comprising a relatively flexible core of thin sheet material, a plurality of turns of heating wire carried by said core, one or more approximately sine wave shaped plates in proximity to said heating wire, and means for insulating said core from said plate or plates.

20. A heating element for an electric hair waver comprising an approximately sine wave shaped thin element, a plurality of turns of heating wire carried by said element, one or more approximately sine wave shaped metallic plates in proximity to said heating wire, and means for insulating said element from said plate or plates.

21. An electric hair waver comprising in combination a metallic wave shaped plate, a heating element having a shape corresponding to said plate, means for electrically insulating said heating element from said plate and fixing the amount of heat transferred by said heating element to said plate, and means for pressing the hair against said plate whereby to impart a wave form to said hair corresponding to the wave form of said plate.

22. In an electric hair waver, the combination with a sinuous shaped casing, of a flexible heating element arranged therein, and means for pressing the hair into contact with said casing.

23. In an electric hair waver, the combination with a sinuous shaped plate, of a heating element connected thereto, and means for pressing the hair into contact with said plate.

24. In an electric hair waver, the combination with a sinuous shaped casing, of a heating element arranged therein, a tubular stem connected to the said casing and through which the conductor wires pass, and a fork carried by said stem and adapted to bring the hair into contact with the sinuous shaped casing.

25. In an electric hair waver, the combination of a hollow casing, of a hollow stem leading thereto, and through which the conductor wires pass, heating elements arranged in said hollow casing, a handle pivotally connected with the hollow stem and means carried by said handle for pressing the hair into contact with the hollow casing.

26. In an electric hair waver, the combination with a sinuous shaped member, of a handle connected thereto, a bifurcated member and handle connected thereto, said handles being pivotally connected together whereby said bifurcated member can press the hair into contact with the sinuous member, and a heating element arranged in one of said members and conductor wires leading through the handle of said member to said heating element.

27. In an electric hair waver, a sinuous shaped metallic casing and tubular stem connected therewith, of a flexible heating element shaped for arrangement in said casing and conductor wires passing through the tubular stem and connected with said heating element, and a bifurcated member pivotally connected to the tubular stem and adapted to bring the hair into contact with the sinuous metallic casing.

In testimony whereof, I hereunto affix my signature.

ROBERT P. SIMMONS.